United States Patent [19]

Kutzavitch

[11] 4,306,119
[45] Dec. 15, 1981

[54] TELEPHONE OUTPULSING CIRCUIT

[75] Inventor: Walter G. Kutzavitch, Indianapolis, Ind.

[73] Assignee: Bell Telephone Laboratories, Incorporated, Murray Hill, N.J.

[21] Appl. No.: 165,955

[22] Filed: Jul. 3, 1980

[51] Int. Cl.³ .................. H04M 1/31; H04M 19/00
[52] U.S. Cl. ........................ 179/90 K; 179/18 FA; 179/81 R
[58] Field of Search .......... 179/90 K, 90 BD, 18 GF, 179/18 FA, 81 R

[56] References Cited

U.S. PATENT DOCUMENTS

| | | | |
|---|---|---|---|
| 3,932,707 | 1/1976 | Connolly et al. | 179/90 K |
| 3,973,084 | 8/1976 | Hovland | 179/90 K |
| 4,046,971 | 9/1977 | Losehand | 179/90 K |
| 4,060,699 | 11/1977 | Ataka et al. | 179/18 GF |
| 4,081,619 | 3/1978 | Losehand | 179/90 K |
| 4,167,654 | 9/1979 | Bolns et al. | 179/81 R |
| 4,167,655 | 9/1979 | Hestad et al. | 179/90 K |
| 4,223,186 | 9/1980 | Hartmann | 179/81 R |

FOREIGN PATENT DOCUMENTS 2652534  3/1978  Fed. Rep. of Germany ... 179/90 K

OTHER PUBLICATIONS

"Semiconductors Provide New Features" *Telephony* Oct. 29, 1979, pp. 60, 64–66, 68, 69, and 101, Victor Godbole.

*Primary Examiner*—Gerald L. Brigance
*Attorney, Agent, or Firm*—Samuel R. Williamson

[57] ABSTRACT

In a telephone system wherein a polarity reversible dc voltage is provided by a central office, a telephone outpulsing circuit utilizing field-effect transistors (21-24) performs the additional function of a polarity guard. Arranged in a rectifying configuration, the field-effect transistors connect the telephone line (10, 11) from a central office to a telephone set requiring a single polarity. The low ON resistance of the field-effect transistors consumes relatively little power from the central office, thus allowing a higher voltage to the telephone set than is available with a conventional polarity guard. The circuit also performs a switchhook flash function and senses the voltage on the telephone line such that if a predetermined level is exceeded, the field-effect transistors are turned OFF and this higher voltage is prevented from reaching the telephone set.

12 Claims, 3 Drawing Figures

TELEPHONE OUTPULSING CIRCUIT

BACKGROUND OF THE INVENTION

1. Technical Field

This invention relates to signaling apparatus and more specifically to telephone signaling apparatus which generate pulses of electric current for transmission over a telephone line.

2. Description of the Prior Art

It is well known in the art to use dial pulsing telephone sets in combination with pulse responsive switching equipment at a central office. In such sets circuitry operate to momentarily break or interrupt the connection of the tip and ring lines forming the subscriber loop between the central office and the telephone set. These interruptions of a direct current provided by the central office are representations of called numbers being transmitted from the telephone set to the central office.

In sets having pushbutton-type number entry, the dial pulsing is generally done asynchronously with the number entry since the number entry can occur at a much higher rate of speed than the dial pulses can be accepted at the central office. The telephone set thus stores the dialing information and activates a pulsing circuit in accordance with this information in a proper sequence. Each stored number comprises a pulse train and is transmitted at the rate required by the pulse responsive switching equipment at the central office where pauses between the pulse series define different numbers.

Operating power is not available from the central office during the break intervals. And those telephone sets requiring this power should have internal circuitry with low power requirements and minimal circuitry in the subscriber loop that reduces the voltage available to the telephone set. This is desirable since a local electrical store, such as a capacitor, is generally utilized to retain over the dial pulsing period the voltage required to operate the internal circuitry during the break intervals.

Various dial pulse arrangements have been proposed and used heretofore employing a relay to momentarily break the connection of the tip and ring lines between the central office and the telephone set. An example of such an arrangement is seen in U.S. Pat. No. 4,046,971, issued to H. Losehand on Sept. 6, 1977. Relays as a rule, however, consume considerably more current than solid-state switches and are less preferable where low power requirements exist.

Recent advances in solid-state technology allow for producing electronic telephones that avoid the use of relays in providing the dial pulsing functions. An example of such a circuit arrangement appropriate for telephone outpulsing is disclosed in U.S. Pat. No. 3,973,084, issued to P. J. Hovland on Aug. 3, 1976. The circuit has solid-state switching, but also includes a polarity guard to maintain a single polarity voltage from a central office. While such an arrangement has been satisfactory where there is ample loop current available from the central office, nevertheless, at low loop current levels the voltage drop across the polarity guard circuit becomes a significant factor in limiting the voltage available to the telephone set.

In an effort to overcome this disadvantage, it has been proposed heretofore to substitute Schottky barrier diodes for the silicon diodes currently being used in polarity guard circuits. Although these diodes have a lower series resistance than silicon diodes, they also reduce the voltage reaching the telephone set from the central office and similarly become significant at low loop current levels. Another proposal for minimizing the effect of the polarity guard circuit on the telephone set, and some of the circuitry therein, has been to move the polarity guard circuit to a point in the loop path so that it is in front of the signaling electronics in the telephone set but after the speech network. See Victor Godbole "Semiconductors Provide New Features," *Telephony* (Oct. 29, 1979), pages 60–101. However, since an active speech network is replacing the conventional passive speech network in new electronic telephones, the polarity guard circuit must also be located in front of the active speech network as well to protect it against voltage polarity reversals from the central office.

SUMMARY OF THE INVENTION

The present invention simplifies and reduces the amount of circuitry and the level of stored voltage necessary at a subscriber's station for generating electrical signal currents or pulses which are suitable for transmission over a telephone line. In accordance with the invention, one aspect is directed to a telephone set in which conventional solid-state outpulsing circuitry in combination with a polarity guard is replaced by a single outpulsing circuit in which the active devices, such as Insulated Gate Field-Effect Transistors (IGFETs), used therein, also provide the function of a polarity guard. Arranged in a rectifying configuration, the devices connect the subscriber loop from a central office having reversible polarity dc voltage to a telephone set requiring a single voltage polarity. The low ON resistance of the active devices consumes relatively little power from the central office, thus allowing an increased voltage level to the telephone set over that available with a conventional polarity guard. The circuit also senses the voltage on the subscriber loop such that if a predetermined level is exceeded, the active devices are turned OFF and this higher voltage is prevented from reaching the telephone set.

In accordance with the invention, another aspect is directed to the outpulsing circuit performing the function of a timed switchhook flasher. Much of the signaling to Electronic Switching System (ESS) offices now involves a timed flash signal when a subscriber wants to request a special service from the switching system. In that some telephone sets now include programmable switchhook flash circuits, these sets, when using the circuit of this invention, are capable of performing dial pulsing and/or switchhook flash functions with very little current and voltage, thus minimizing the amount of stored voltage needed inside the telephone set.

BRIEF DESCRIPTION OF THE DRAWING

The invention and its mode of operation will be more clearly understood from the following detailed description when read with the appended drawing in which.

DETAILED DESCRIPTION

Figure 1:
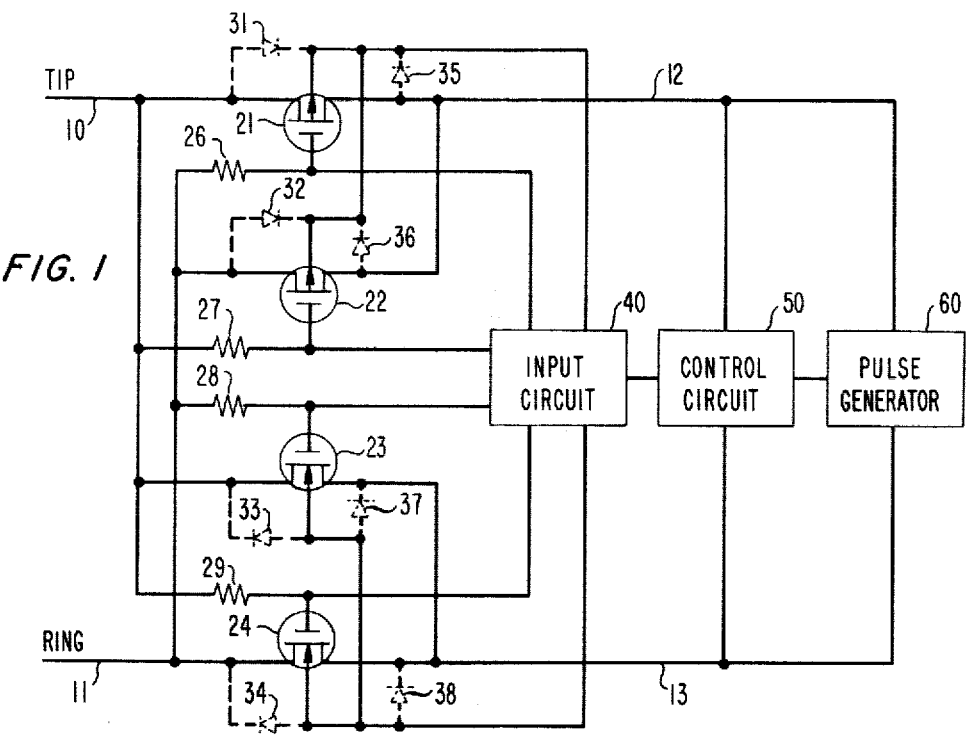
FIG. 1 depicts a schematic diagram of the outpulsing circuitry.

Referring now to FIG. 1, there is shown the outpulsing circuit comprising IGFET devices 21 through 24 arranged in a rectifying configuration to provide the function of a polarity guard. As a result, dc voltage of either polarity present across the tip and ring lines 10 and 11 appears as positive on the guarded tip line 12 and negative on the guarded ring line 13. Also shown are an input circuit 40 for driving the IGFETs, a control circuit 50, and a pulse generator 60.

Connected to the tip line 10 are the drains of IGFETs 21 and 23, and the gates of IGFETs 22 and 24 through series resistors 27 and 29, respectively. Connected to the ring line 11 are the drains of IGFETs 22 and 24, and the gates of IGFETs 21 and 23 through series resistors 26 and 28, respectively. The sources of IGFETs 21 and 22 are connected to the guarded tip line and the sources of IGFETs 23 and 24 are connected to the guarded ring line. IGFETs 21 and 22 are p-channel devices and IGFETs 23 and 24 are n-channel devices.

The polarity of the voltage across the tip and ring lines 10 and 11 determines which two of the four IGFETs 21 through 24 are turned ON at any instant in time. If the tip line 10 is positive with respect to the ring line 11, IGFETs 21 and 24 are turned ON and IGFETs 22 and 23 are turned OFF. If the tip line 10 is negative with respect to the ring line 11, then IGFETs 22 and 23 are turned ON and IGFETs 21 and 24 are turned OFF. Gate bias voltage for turning ON IGFETs 21 and 23 is provided by ring line 11 whereas gate bias for turning ON IGFETs 22 and 24 is provided by tip line 10.

IGFETs of the type seen in FIG. 1 have low ON resistances on the order of 4-8 ohms and are commercially available from Supertex, Incorporated. As the IGFETs turn ON, a very low resistance path is provided from the tip and ring lines 10 and 11 to the guarded tip and ring lines 12 and 13. Thus the polarity guard function is provided with very low insertion loss added to the subscriber loop.

Due to the physical structure of an IGFET device, an internal spurious diode exists from the drain of each IGFET to the substrate of that IGFET. Also, if the typical source-to-substrate connection is left open in the construction of the IGFET, as is the case in IGFETs 21 through 24, then an internal spurious diode also exists between the source of each IGFET and the substrate of that IGFET. These drain-to-substrate and source-to-substrate diodes are shown in FIG. 1 as 31 through 38. Since the drain and source are isolated by the substrate, any drain-to-source current in the absence of gate voltage is extremely low because the structure is analogous to two diodes connected back-to-back. To guard against the rupture of the gate-to-substrate junction of IGFETs 21 through 24 due to possible voltage buildup thereacross, sufficient gate protection must either exist therein or be provided externally.

Figure 2:
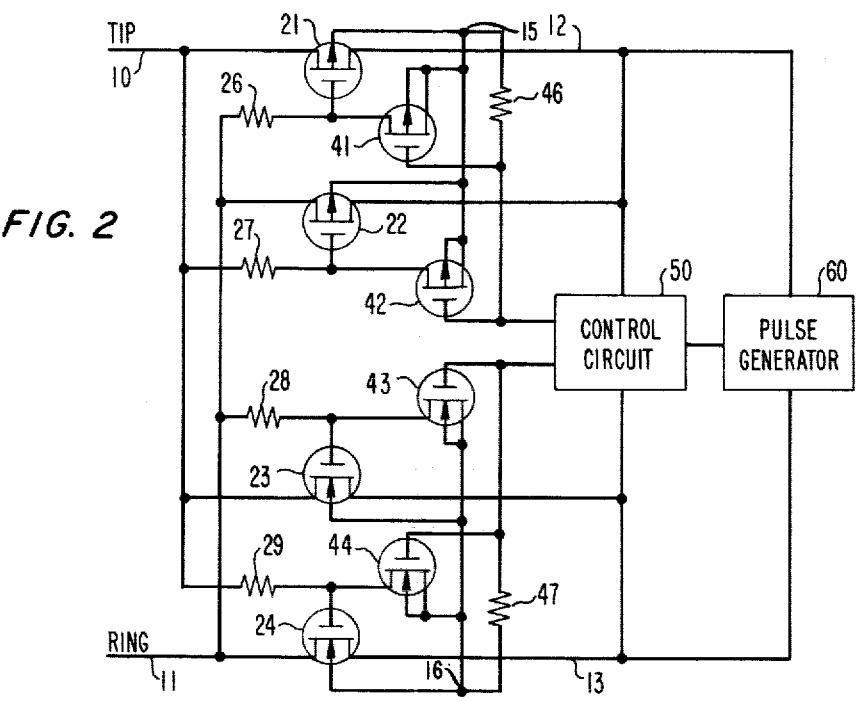
FIG. 2 depicts a schematic diagram of the outpulsing circuit arrangement of FIG. 1 according to the invention in further detail.

Referring to FIG. 2, the detail circuitry of a suitable input circuit for turning ON and OFF IGFETs 21 through 24 to accomplish the outpulsing function is shown. This circuitry is activated by the control circuit 50 and comprises transistors 41 through 44 which are shown as but need not be IGFETs, and resistors 46 and 47 that hold transistors 41 through 44 OFF when the control circuit 50 is OFF. In generating a break interval, the control circuit 50 establishes a conduction path between resistors 46 and 47. Current then flows through these resistors allowing the voltage to build up across the substrate-to-gate terminals of transistors 41 through 44 turning them ON. As transistors 41 through 44 turn ON, they essentially provide a short-circuit between the substrates and gates of IGFETs 21 through 24, respectively. This short-circuit reduces the potential between the gate and the substrate to below the turn ON voltage and conduction through the IGFET ceases.

System signaling requirements are such that during a break or dial pulse interval, the impedance between the tip and ring lines 10 and 11 must be greater than 150 kohms. Resistors 26 through 29 are provided so that the respective shorts via transistors 41 through 44 do not provide a short across the telephone line through the spurious diodes as seen in FIG. 1. By way of example, when transistor 41 turns ON, a current path exists from the tip line 10 through diode 31, transistor 41, and resistor 26 to the ring line 11. Resistor 26 thus provides the necessary series impedance between the tip and ring lines 10 and 11 when transistor 41 is turned ON. Resistors 27 through 29 similarly provide a series impedance for transistors 42 through 44, respectively, when in the ON state. Since two resistors 26 and 28, or 27 and 29 will be in parallel any time the IGFETs are turned OFF to form the dial pulse interval, each resistor 26 through 29 must have a resistance of at least 300 kohms.

The addition of transistors 41 through 44, however, further alters the tip-to-ring line impedance. As earlier indicated, the conduction path through resistors 46 and 47 is provided by activation of the control circuit 50. Resistors 46 and 47 are thus placed in series with the internal impedance of the control circuit 50. This series combination is in parallel with the parallel combination of either resistors 26 and 28, or resistors 27 and 29 that shunt the tip and ring lines 10 and 11. Thus the parallel combination of resistors 26 and 28, or resistors 27 and 29, in parallel with the series combination of resistors 46 and 47, and the internal impedance of the control circuit 50, must be greater than 150 kohms. This is achieved by increasing the value of resistors 26 through 29 slightly and maintaining the total series impedance of resistors 46 and 47, and control circuit 50 at about 300 kohms. This ensures that the central office will not see less than 150 kohm resistance when the IGFETs are turned OFF for providing a dial pulse interval.

In the arrangement of FIG. 2, it can be seen that even when IGFETs 21 through 24 are turned OFF, their substrates have a potential that is only 6/10ths of a volt less than or greater than the telephone line potential. For example, consider the case when the IGFETs are OFF and the tip line 10 is positive, the potential on the substrates of IGFETs 21 and 22 will be the voltage at the tip line 10 minus 6/10ths of a volt due to the spurious diodes 31 and 32 previously discussed and shown in FIG. 1. Similarly, the potential on the substrates of IGFETs 23 and 24 will be the voltage at the ring line 11 plus 6/10ths of a volt due to spurious diodes 33 and 34. Thus node point 15 of FIG. 2 will always be positive even when the IGFETs are OFF and similarly node point 16 of FIG. 2 will always be negative when the IGFETs are OFF. This allows for use of a bipolar transistor or other polarity-sensitive switching device in establishing a conduction path between resistors 46 and 47.

Figure 3:
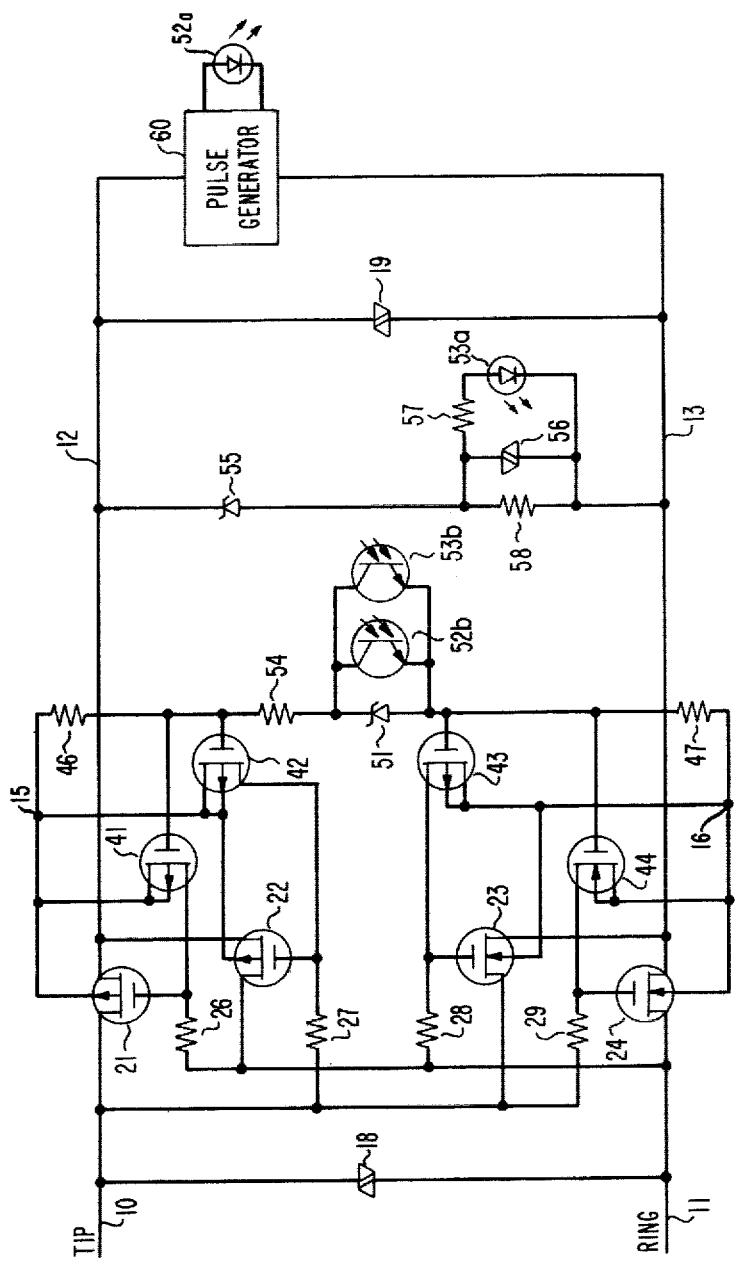
FIG. 3 illustrates a detailed arrangement of the schematic diagram depicted in FIG. 2 interconnected in a pulse signaling system.

Referring to FIG. 3, the outpulsing circuit of FIG. 2 is further arranged to include the details of a suitable control circuit for driving the input circuit, the outpulsing circuit being interconnected in a pulse signaling system. The control circuit of FIG. 3 uses the guaranteed polarity of node points 15 and 16 to allow diode 51, and transistors 52b and 53b to directly control the input circuit. Resistor 54 comprises the internal impedance of the control circuit when it is activated and is used to limit the current through diode 51, and transistors 52b and 53b. The circuit works as follows: A pulse generator 60 suitable for producing dial pulses and including an electrical store, such as a capacitor, provides current pulses to a diode 52a. This diode is the light-emitting diode portion of an opto-isolator comprising diode 52a and transistor 52b. Current through diode 52a will cause transistor 52b to conduct, transistors 41–44 to turn ON, and the IGFETs to turn OFF.

With the pulse generator arranged to provide a single pulse of approximately 450 milliseconds, the telephone outpulsing circuit performs as a timed switchhook flasher. Much of the special service signaling to ESS offices now involves a timed switchhook flash signal. For switchhook flash signaling, current cannot be drawn from the line while the signal is present. Thus, as in the dial pulse interval, the power for generating the switchhook flash signal must be stored in the telephone set for this period of time. Telephone sets having the circuitry of this invention are able to perform rotary dial pulsing and/or switchhook flash functions with very little current and voltage, thereby minimizing the amount of stored voltage needed inside the telephone set.

To operate the outpulsing circuit for switchhook flash signaling involves the same basic circuitry that is used for dial pulsing. Pulse generator 60 provides current through diode 52a which, in turn, activates transistor 52b. Turning transistor 52b ON completes a current path from node point 15 through resistors 46, 54, and 47 to node point 16. The voltage buildup across resistors 46 and 47 activates transistors 41, 42, 43, and 44 and causes the IGFETs to turn OFF. As long as current flows through diode 52a, the IGFETs will remain OFF. When the current through diode 52a is removed, transistor 52b turns OFF and resistors 46 and 47 discharge the gates of transistors 41, 42, 43, and 44. This then allows resistors 26 through 29 to apply the turn ON voltage to the IGFET gates reestablishing the low impedance path from the tip and ring lines 10 and 11 to the pulse generator 60. In this manner, the outpulsing circuit is reactivated at the end of either a dial pulse or switchhook flash interval.

To guard against high voltages on the subscriber loop reaching and damaging the electronics in the telephone set, voltage surge protection circuitry is included in the outpulsing circuit. When the IGFETs are ON and current is being conducted through to the pulse generator 60 and other electronic circuitry (not shown) in the telephone set, Zener diode 55 will turn ON if the voltage across the set exceeds a predetermined level, i.e., the threshold level of diode 55 plus the voltage across varistor 56. Exceeding this level causes the light-emitting diode 53a to turn ON the optically-coupled transistor 53b. Transistor 53b then turns ON transistors 41–44 and the IGFETs OFF preventing the voltage on the tip and ring lines 10 and 11 from reaching the telephone set. This safeguard is necessary to protect against these voltage surges, such as caused by lightning or a power cross. Thus the IGFETs do not have to carry heavy surge-type currents.

While the IGFETs are turned OFF, a discharge path exists from the tip line 10 through one of the spurious diodes of IGFETs 21 or 22 to node point 15, then through resistors 46 and 54, Zener diode 51, resistor 47 to node point 16 and through one of the spurious diodes in IGFETs 23 or 24 back to the ring line 11. As long as the telephone line remains above the threshold voltage of Zener diode 51, plus the voltage drops of the spurious diodes and resistors 46, 54, and 47, the IGFETs will remain turned OFF. Therefore, once the IGFETs are turned OFF for any reason by diode 53a, they will remain OFF until the voltage across the tip and ring lines 10 and 11 reduces to some allowable level as determined by diode 51, at which time the path to the telephone set from the tip and ring lines 10 and 11 will be reestablished. Varistor 18 provides current shunting on short subscriber loops and also limits the transients produced on the loop caused by the IGFETs changing between the ON and OFF states. Varistor 19 provides a low impedance clamp to guard against a static discharge occurring on the guarded tip and ring lines 12 and 13. Resistor 57 serves as a current limiter for diode 53a, and resistor 58 allows diode 53a to sense the current flowing through Zener diode 55.

Various modifications of this invention are contemplated and may obviously be resorted to by those skilled in the art without departing from the spirit and scope of the invention as hereinafter defined by the appended claims.

I claim:

1. An outpulsing circuit for use in conjunction with a pulse generator (60), the circuit comprising means for outpulsing over a pair of line conductors (10, 11) a digital signal representation characterized in that
the outpulsing circuit further comprises a first and a second pair of field-effect transistors (21, 24 and 22, 23) for providing a single voltage polarity to the pulse generator.

2. The outpulsing circuit as set forth in claim 1 further characterized in that the first and second pair of field-effect transistors are arranged so that the first pair (21, 24) will be conductive for a first voltage polarity applied across the line conductors and the second pair (22, 23) will be conductive for a second voltage polarity applied across the line conductors, the field-effect transistors providing in the ON state a low impedance path to the pulse generator for a source of direct current connected to the line conductors.

3. The outpulsing circuit as set forth in claim 2 further characterized in that the first pair of transistors includes a first transistor (21) having its drain connected to a first one (10) of the line conductors and its gate connected through a series resistance (26) to the second one (11) of the line conductors, and a second transistor (24) having its drain connected to the second line conductor and its gate connected through a series resistance (29) to the first one of the line conductors, the source of the second transistor providing a reference voltage potential to the pulse generator and the source of the first transistor providing a positive voltage potential to the pulse generator when the first voltage polarity is applied to the line conductors.

4. The outpulsing circuit as set forth in claim 3 further characterized in that the second pair of transistors includes a third transistor (22) having its drain connected to the second one of the line conductors and its gate connected through a series resistance (27) to the first one of the line conductors, and a fourth transistor (23) having its drain connected to the first one of the line conductors and its gate connected through a series resistance (28) to the second one of the line conductors, the source of the fourth transistor providing a reference voltage potential to the pulse generator and the source of the third transistor providing a positive voltage potential to the pulse generator when the second voltage polarity is applied to the line conductors.

5. The outpulsing circuit as set forth in claim 4 further characterized and including an input circuit (40) for receiving the digital signal representations from the pulse generator and for activating the first and second pair of field-effect transistors in accordance with these representations.

6. The outpulsing circuit as set forth in claim 5 further characterized in that the input circuit is connected to the commonly connected substrates of the first and third transistors and to the commonly connected substrates of the second and fourth transistors, operating potential for the input circuit being provided from the line conductors to the substrate via a series of diodes (31–34), the diodes existing between the drain and substrate of each of the field-effect transistors and providing a single voltage polarity to the input circuit.

7. The outpulsing circuit as set forth in claim 6 further characterized in that the input circuit is interconnected to the gate of each transistor of the first and second pair of field-effect transistors for controlling the state of these transistors.

8. The outpulsing circuit as set forth in claim 7 further characterized in that the input circuit comprises a fifth transistor (41) having its drain connected to the gate of the first transistor and its source and substrate commonly connected to the source of the first transistor and its gate connected to the substrate of the first transistor through a series resistance (46), a sixth transistor (42) having its drain connected to the gate of the third transistor, its source and substrate commonly connected to the substrate of the third transistor and its gate connected to the gate of the fifth transistor, a seventh transistor (43) having its drain connected to the gate of the fourth transistor, its source and substrate commonly connected to the substrate of the fourth transistor, and its gate connected to the substrate of the second transistor through a series resistance (47), and an eighth transistor (44) having its drain connected to the gate of the second transistor, its source and substrate commonly connected to the substrate of the second transistor and its gate connected to the gate of the seventh transistor.

9. The outpulsing circuit as set forth in claim 8 further characterized and including a control circuit (50) for interconnecting the pulse generator with the input circuit and for removing the low impedance path to the pulse generator whenever the voltage on the line conductors exceeds a predetermined value.

10. An outpulsing circuit for use in conjunction with a pulse generator (60), the circuit comprising:
an input circuit (40) for receiving digital signals from the pulse generator;
an enable-disable control circuit (50) for interconnecting the pulse generator and the input circuit;
outpulsing circuit means connected to the input circuit for outpulsing the received digital signals over a pair of line conductors (10, 11), the outpulsing circuit means including a first and a second pair of field-effect transistors (21, 24 and 22, 23) for providing a single voltage polarity to the pulse generator.

11. The outpulsing circuit as set forth in claim 10 wherein each one in the first and second pair of field-effect transistors provides in the ON state a low impedance path to the pulse generator for a source of direct current connected to the line conductors.

12. In a communication system including a pair of line conductors (10, 11) and a source of direct current connected to the line conductors, an outpulsing circuit for use in conjunction with a pulse generator (60), the circuit comprising means for outpulsing over the line conductors a switchhook flash signal representation characterized in that
the outpulsing circuit further comprises a first and a second pair of field-effect transistors (21, 24 and 22, 23) for providing a single voltage polarity to the pulse generator.

* * * * *